(12) United States Patent
Shimamura et al.

(10) Patent No.: US 7,008,720 B2
(45) Date of Patent: Mar. 7, 2006

(54) BATTERY HAVING A TERMINAL LEAD SURFACE COVERING LAYER AND RELATED METHOD

(75) Inventors: Osamu Shimamura, Yokosuka (JP); Hideaki Horie, Yokosuka (JP); Kyoichi Watanabe, Yokosuka (JP); Takaaki Abe, Yokosuka (JP); Takanori Itou, Zushi (JP); Hiroshi Sugawara, Yokosuka (JP); Yuuji Tanjou, Yokohama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 316 days.

(21) Appl. No.: 10/384,664

(22) Filed: Mar. 11, 2003

(65) Prior Publication Data

US 2003/0193317 A1 Oct. 16, 2003

(30) Foreign Application Priority Data

Apr. 11, 2002 (JP) ............................ P2002-109187

(51) Int. Cl.
*H01M 2/06* (2006.01)
(52) U.S. Cl. ...................... 429/179; 429/184; 29/623.1
(58) Field of Classification Search ................ 429/181, 429/161–164, 178–179, 184
See application file for complete search history.

(56) References Cited

U.S. PATENT DOCUMENTS

| 4,477,544 | A | | 10/1984 | Bruder | |
| 5,948,562 | A | * | 9/1999 | Fulcher et al. | ............. 429/181 |
| 6,316,140 | B1 | * | 11/2001 | Hatazawa et al. | ........... 429/163 |
| 6,531,246 | B1 | * | 3/2003 | Hanafusa et al. | ............ 429/162 |
| 2001/0021471 | A1 | | 9/2001 | Xing et al. | |

FOREIGN PATENT DOCUMENTS

| EP | 1 202 371 A1 | | 5/2002 |
| EP | 1353389 | * | 3/2003 |
| JP | 11-224652 | | 8/1999 |
| JP | 11-260343 A | | 9/1999 |
| JP | P2000-133218 A | | 5/2000 |
| JP | 2000215879 | * | 8/2000 |

(Continued)

OTHER PUBLICATIONS

Linden, D.R. "Handbook of Batteries" McGraw-Hill, 2nd Ed., 28.5-28.6.*

*Primary Examiner*—Mark Ruthkosky
(74) *Attorney, Agent, or Firm*—McDermott Will & Emery LLP

(57) ABSTRACT

A battery includes a plurality of flat type batteries and a connector member that electrically connect the plurality of flat type batteries to one another. Each of the plurality of flat type batteries is provided with an outer sheath having a composite laminate film, an electric power generating component, which includes a positive electrode plate, a separator and a negative electrode plate and is accommodated in the outer sheath by compelling at least a part of a circumference of the outer sheath to be joined by thermally welded portions, a positive-electrode terminal lead conductive with the positive electrode plate and held between the thermally welded portions, and a negative-electrode terminal lead conductive with the negative electrode plate and held between the thermally welded portions. At least one of the positive-electrode terminal lead and the negative-electrode terminal lead has a surface covering layer made of a metal different from that of its terminal mother material.

12 Claims, 11 Drawing Sheets

FOREIGN PATENT DOCUMENTS

| | | |
|---|---|---|
| JP | 2000-277092 A | 10/2000 |
| JP | 2001-043835 A | 2/2001 |
| JP | 2001-052681 A | 2/2001 |
| JP | 2001-057183 A | 2/2001 |
| JP | 2001-57203 A | 2/2001 |
| JP | 2001-167752 A | 6/2001 |

* cited by examiner

BATTERY HAVING A TERMINAL LEAD SURFACE COVERING LAYER AND RELATED METHOD

BACKGROUND OF THE INVENTION

The present invention relates to a battery and a related method and, more particularly, to a battery and a related method using a flat type battery with a structure wherein an outer sheath material is formed of a composite laminate film made of polymer-metal to allow circumferences thereof to be joined to one another by thermal welding for thereby accommodating and sealing an electric power generating component composed of a positive electrode plate, a separator and a negative electrode plate Recently, electric vehicles powered by electric power outputs of drive sources and hybrid cars powered by engines and motors in combination attract public attention, and a development work has taken up an important weight in an industrial field to provide a battery with a high energy density and high power output for these applications.

The batteries for these applications include a structure wherein a wound electric power generating component is accommodated in a cylindrical case and a structure wherein the wound electric power generating component or an electric power generating component composed of a stack of flat-plate shaped electrodes and separators is accommodated in a flat case.

Further, Japanese Patent Application Laid-Open Publication No. 11-224652 discloses a battery wherein an outer sheath is made of a laminate film whose circumference is sealed by thermal welding to provide a hermetically sealed structure.

Furthermore, Japanese Patent Application Laid-Open Publication No. 2000-133218 discloses a structure wherein at least either one of electrode terminal leads includes a lead wire which is preliminarily covered with resin to provide an improved sealing property.

SUMMARY OF THE INVENTION

However, upon careful studies conducted by the present inventors, with the battery using the cylindrical type or flat type cases, since the cases must be formed of metallic enclosures to have desired strengths, there is a tendency to be hard to provide a reduced weight. To address this issue, it becomes important to obtain a battery with a higher energy density and power output while attaining reduction in weight of the battery.

Further, with the battery employing the battery outer sheath made of the laminate film, it is conceivable that the battery tends to be deformed due to external forces or to have a deteriorated sealing property owing to an increase in an internal pressure caused by temperature rise in the battery. Especially, when using the batteries installed in the electric vehicle and the hybrid car, there are some instances where the battery temperature rises to a value of approximately 60° C. When this takes place, since a large electric current flows through the electrode terminal leads during charging and discharging steps and, so, the temperatures of the electrode terminal leads become higher than that of the battery by a value of approximately 30° C. to reach a softening point (of about 90° C.) of resin used in the laminate film. Under such a situation, it is conceivable that an increase in the internal pressure of the battery particularly tends to adversely affect the sealing property of the laminate film at an area in contact with the electrode terminal lead. Namely, with the battery using the battery outer sheath made of the laminate film, it becomes important how to enhance the sealing property equal to or greater than that obtained in the metal case.

Further, with the battery wherein at least either one of the electrode terminals leads includes a lead wire preliminarily covered with resin, while the sealing property is maintained at the beginning of a manufacturing stage, it is conceived that, for a reliability to be provided for a prolonged time period when installed on the electric vehicle and the hybrid car, there is a need for further improving an anti-corrosion property to prevent corrosion of the electrode terminal caused by an electrolyte decomposing product. Namely, resin per se covered onto the lead wire comes to be gradually corroded due to the electrolytic decomposing product (including radical products), and it is conceivable that the sealing property tends to be deteriorated during operation of the battery for a relatively long time period. Furthermore, there are some instances where the temperature of the electrode terminal lead reaches the softening point of the covering resin layer during charging and discharging steps and, so, it is conceived that, due to a difference in thermal expansion between the lead wire (metal) and the covering resin layer or the internal pressure of the battery, separation or gap tend to occur at a boundary surface (joined surface) between the lead wire and the covering resin layer to cause the electrolyte or the decomposing product thereof to penetrate through interfaces of a lead-wire terminal portion inside the battery.

The present invention has been completed upon various studies by the present inventors set forth above and has an object to provide a battery and its related method wherein a unit cell has an outer sheath material, which is composed of a composite laminate film made of polymer-metal, and provides an improved reliability in a sealing property thereof to allow a plurality of unit cells to be connected to enhance a charging and discharging performance in a large electric current capacity.

To achieve the object, in one aspect of the present invention, a battery comprises: a plurality of flat type batteries each of which is provided with: an outer sheath having a composite laminate film made of polymer and metal; an electric power generating component including a positive electrode plate, a separator and a negative electrode plate and accommodated and hermetically sealed in the outer sheath by compelling at least a part of a circumference of the outer sheath to be joined by thermal welding to form thermally welded portions; a positive-electrode terminal lead conductive with the positive electrode plate and held between the thermally welded portions to be exposed to an outside of the outer sheath; and a negative-electrode terminal lead conductive with the negative electrode plate and held between the thermally welded portions to be exposed to the outside of the outer sheath, at least one of the positive-electrode terminal lead and the negative-electrode terminal lead having a surface covering layer made of a metal different from that of a terminal mother material of the least one of the positive-electrode terminal lead and the negative-electrode terminal lead; and a connector member electrically connecting the plurality of flat type batteries to one another.

Besides, in another aspect the present invention, a method of manufacturing a battery, comprises: preparing a plurality of flat type batteries each of which is provided with: an outer sheath having a composite laminate film made of polymer and metal; an electric power generating component including a positive electrode plate, a separator and a negative electrode plate and accommodated and hermetically sealed in the outer sheath by compelling at least a part of a circumference of the outer sheath to be joined by thermal welding to form thermally welded portions; a positive-electrode terminal lead conductive with the positive electrode plate and held between the thermally welded portions to be exposed to an outside of the outer sheath; and a negative-electrode terminal lead conductive with the negative electrode plate and held between the thermally welded portions to be exposed to the outside of the outer sheath, at least one of the positive-electrode terminal lead and the negative-electrode terminal lead having a surface covering layer made of a metal different from that of a terminal mother material of the at least one of the positive-electrode terminal lead and the negative-electrode terminal lead; and electrically connecting the plurality of flat type batteries to one another.

Other and further features, advantages, and benefits of the present invention will become more apparent from the following description taken in conjunction with the following drawings.

DETAILED DESCRIPTION OF THE PREFERRED EMBODIMENT

Before entering into concrete descriptions of Examples and Comparative Example, a battery of an embodiment according to the present invention and its related method are described suitably with reference to the accompanying drawings.

Figure 1:
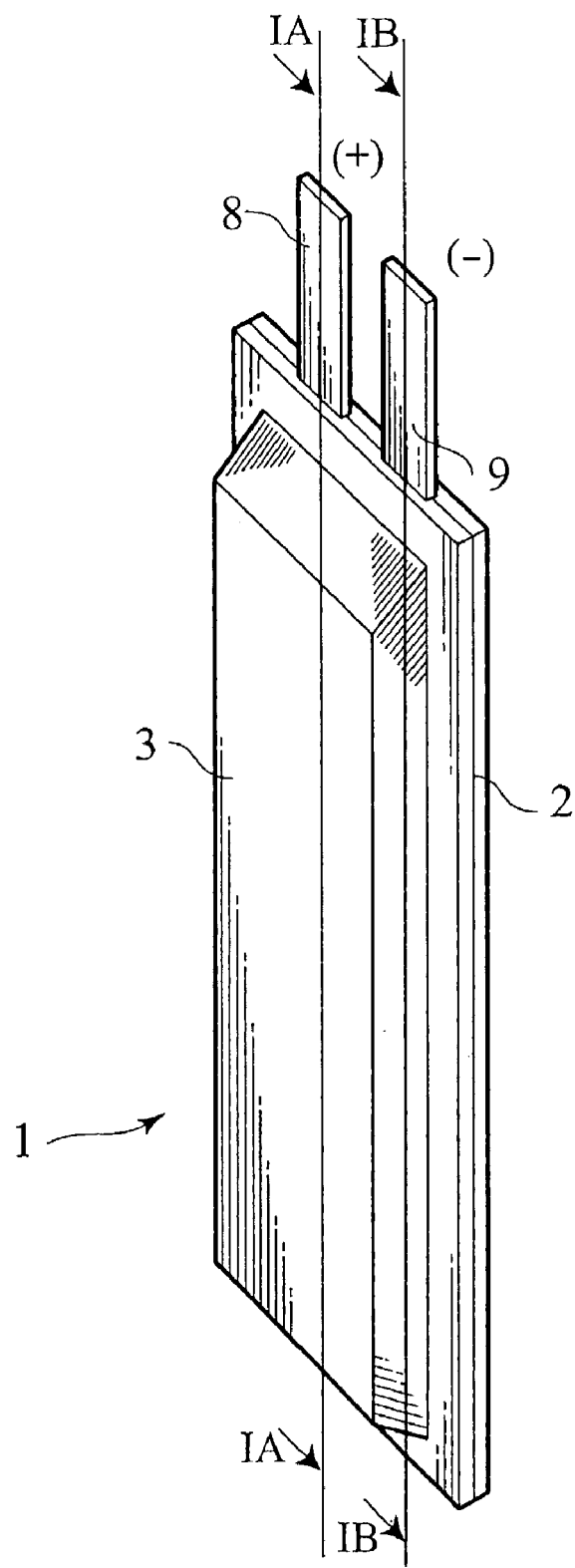
FIG. 1 is a schematic perspective view of a flat type battery of an embodiment according to the present invention.
Figure 2:
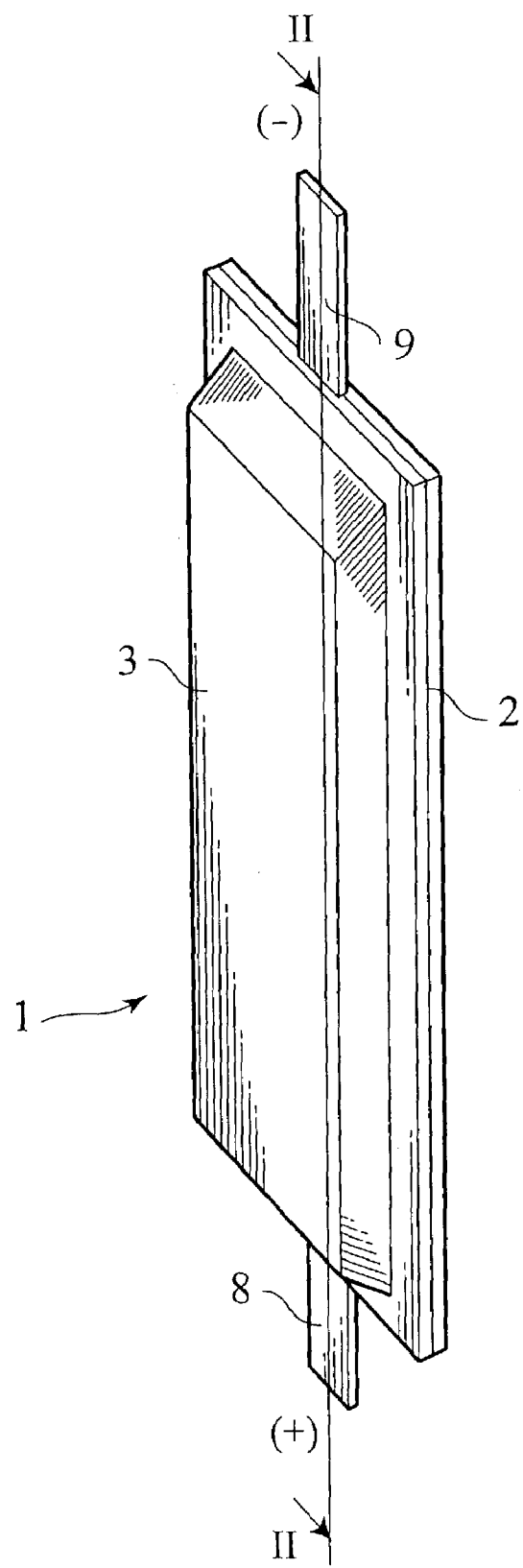
FIG. 2 is a schematic perspective view of a flat type battery of another example of the embodiment according to the present invention.

As shown in FIGS. 1 and 2, a unit cell 1 for use in the presently filed embodiment includes a flat type battery which is comprised of two sheets of outer sheaths 3 each made of a polymer-metal composite laminate film with an entire circumference being joined to one another to form a thermally welded portion 2 by thermal welding. Here, with the flat type battery 1 shown in FIG. 1, both of a positive-electrode terminal lead 8 and a negative-electrode terminal lead 9 are taken out at the same one end of the thermally welded portion 2. Of course, the present invention is not limited to such a specific structure and, as shown in the flat type battery 1 shown in FIG. 2, the positive-electrode terminal lead 8 and the negative-electrode terminal lead 9 may be taken out at one and the other end of the thermally welded portion 2.

Figure 3:
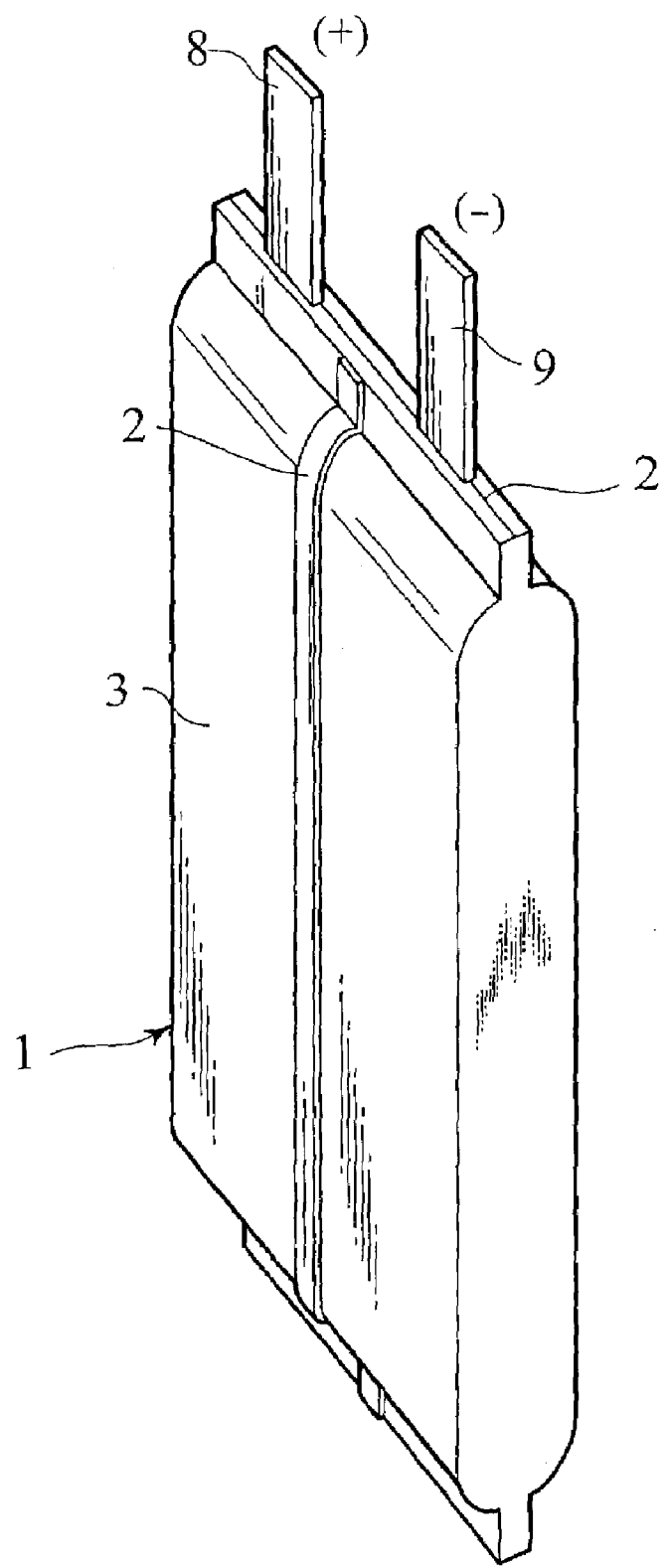
FIG. 3 is a schematic perspective view of a flat type battery of another example of the embodiment according to the present invention.

As shown in FIG. 3, further, the unit cell 1 for use in the presently filed embodiment may be comprised of a flat type battery wherein one sheet of an outer sheath 3, made of the polymer-metal composite laminate film, is prepared and folded back to form a bursiform shape whose circumference has opening portions that are joined to form bladder welded portions 2 by thermal welding. Here, both of the positive-electrode terminal lead 8 and the negative-electrode terminal lead 9 are taken out at the same one terminal end of the thermally welded portions 2.

Of course, with the structure set above, no limitation is intended to a location at and a direction in which the positive-electrode terminal lead 8 and the negative-electrode terminal lead 9 are taken out, and such a position and direction may be arbitrarily determined. Also, the thermally welded portions 2 may be formed by compelling terminal ends of the outer sheath 3 to be mutually joined or by compelling the terminal ends of the outer sheath 3 to be overlapped and joined.

Further, although a detail of the concrete structure is described below, electrodes of the unit cell may include a positive electrode that enables occlusion and removal of a lithium ion and a negative electrode that enables occlusion and removal of the lithium ion. An electric power generating component other than these electrodes may include a separator and an electrolytic solution seeped therein, a solid electrolyte or a gel electrolyte, or a solid electrolyte or a gel electrolyte involving the separator, thereby enabling a flat type lithium ion battery, a solid electrolyte battery or a gel electrolyte battery to be formed.

The reason why such a unit cell takes the form of the flat shape resides in the fact that, if the unit cell is formed in a rounded cell structure, there is a limitation in enhancing sealing performances at locations where the positive and negative terminal leads are taken out. Especially, a battery with a high energy density and high power output density for use in an electric vehicle and a hybrid car has a limit in enhancing a long-term reliability in the sealing performances at those locations where the lead terminals are taken out.

Further, although it may be preferable for the positive electrode to be made of a positive-electrode active material composed of a principal material such as $LiCoO_2$, $LiMn_2O_4$ or $LiNiO_2$ and for the negative electrode to be made of a negative-electrode active material composed of principal material including graphite or amorphous carbon as hard carbon, the present invention is not limited to such compositions.

In the meantime, hereinafter, the positive electrode refers to a structure that includes positive-electrode current collectors and the positive-electrode terminal leads mounted at respective distal ends thereof. A positive electrode plate refers to a structure that includes reacting portions, among the positive-electrode current collectors, which are equipped with the positive electrode active material.

Similarly, the negative electrode refers to a structure that includes the negative-electrode current collectors and negative-electrode terminal leads mounted at respective distal ends thereof. A negative electrode plate refers to a structure that includes reacting portions, among the negative electrode current collectors, which are equipped with the negative electrode active material.

Accordingly, it can be concluded that the typical electric power generating component of the presently filed embodiment is at least comprised of the negative electrode plate, the separator and the positive electrode. In the broad sense, it can be concluded that the electric power generating component of the presently filed embodiment is comprised of the whole of the entire negative electrode, the separator and the whole of the entire positive electrode.

Further, the separator forming a part of essential elements of the electric power generating component of the presently filed embodiment is not limited to a specific configuration and, furthermore, the separator may not be tied with its designation. In place of the separator, it may be possible to employ the solid electrolyte or the gel electrolyte with a function (role) serving as the separator. That is, the solid electrolyte battery and the gel shaped electrolyte battery, to which the structure of the presently filed embodiment can be applied, may take a form of a structure wherein the electric power generating component, including the solid electrolyte or the gel shaped electrolyte located between the positive-electrode active material layer of the positive electrode plate and the negative-electrode active material layer of the negative electrode plate, is accommodated in the outer sheath made of the laminate film with the circumferential periphery of the outer sheath being thermally welded to be hermetically sealed. Also, such an electric power generating component can include the electrolytic solution or the electrolyte set forth above.

More particularly, the electric power generating component of the flat type battery 1 of the presently filed embodiment wherein the positive electrode plates, the separators and the negative electrode plates are stacked or wound is described below with reference to a structure wherein such components are stacked, for the purpose of simplifying the description.

Figure 4A:
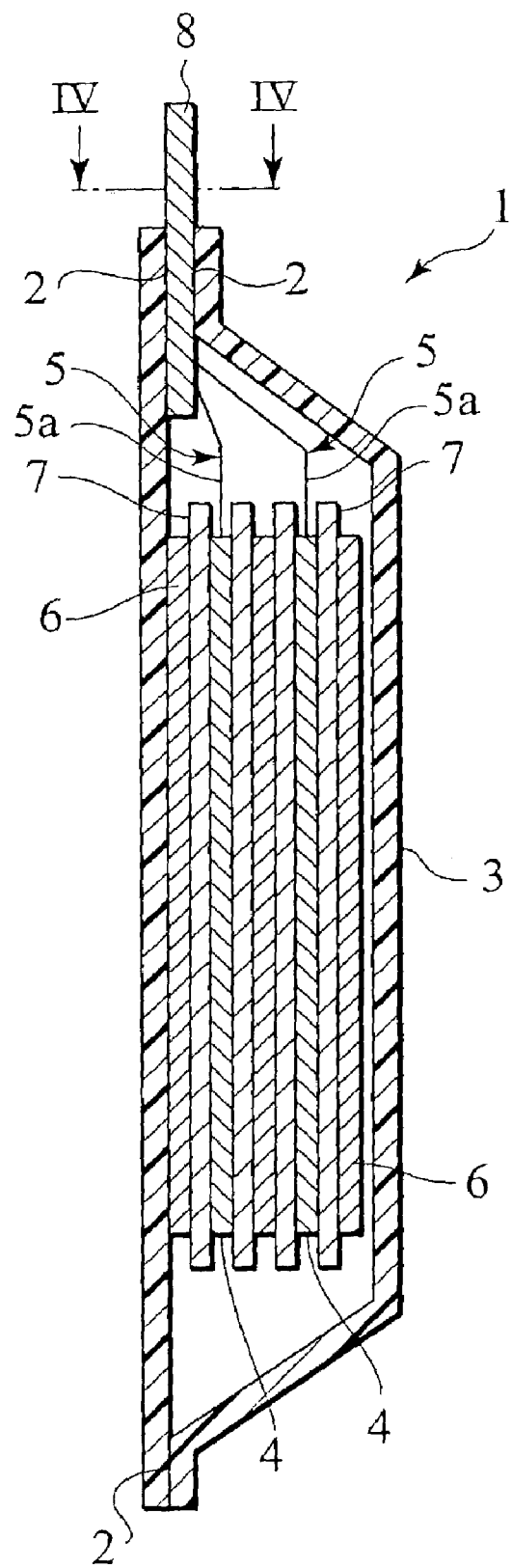
FIG. 4A is a cross sectional view taken on line IA—IA of FIG. 1.
Figure 4B:
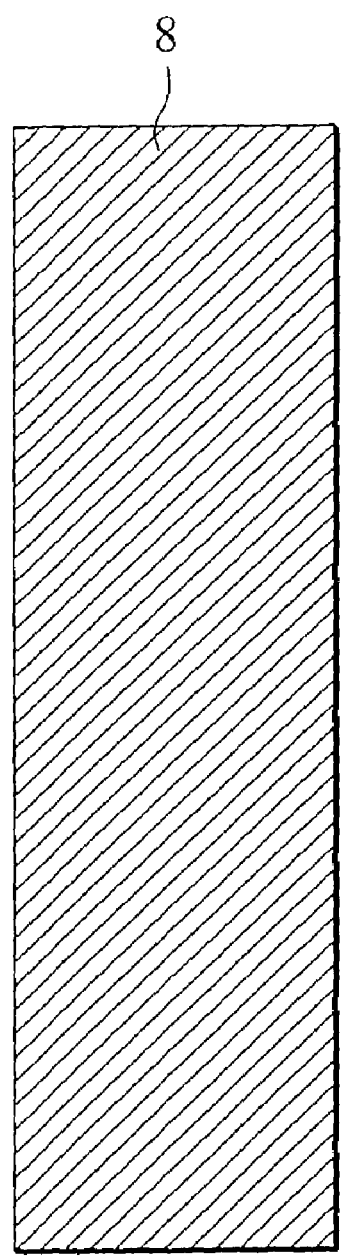
FIG. 4B is an enlarged cross sectional view taken on line IV—IV of FIG. 4A.
Figure 5A:
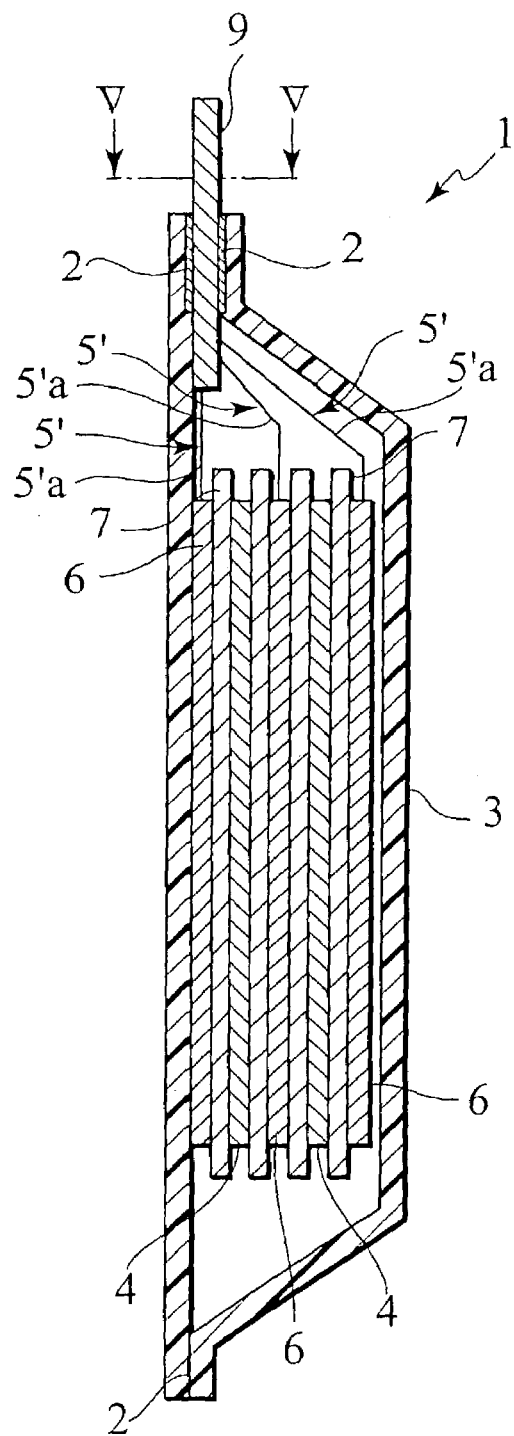
FIG. 5A is a cross sectional view taken on line IB—IB of FIG. 1.
Figure 5B:
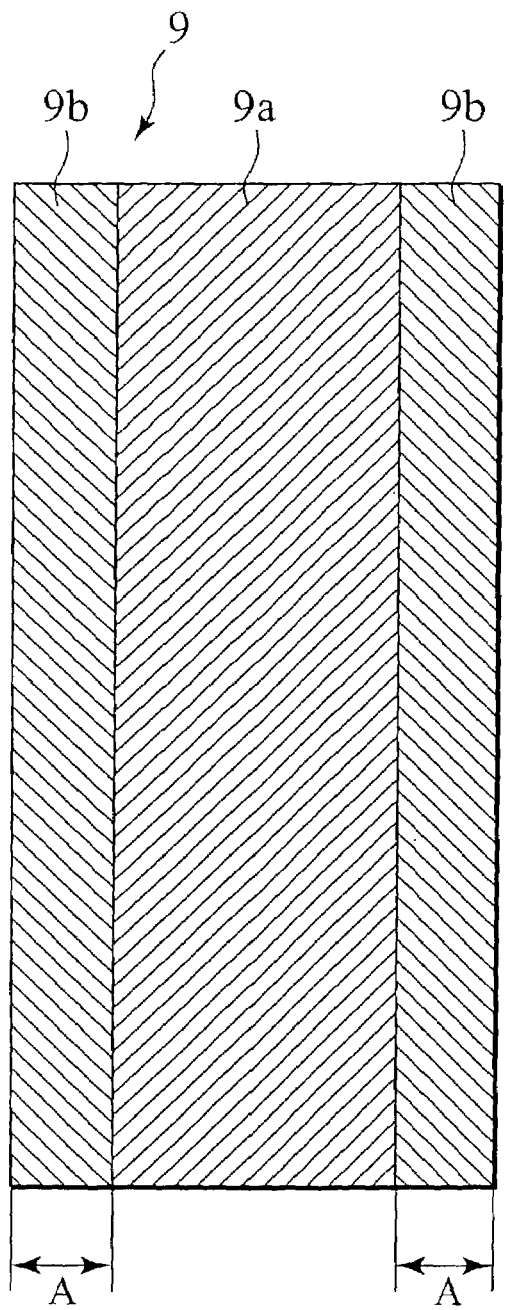
FIG. 5B is an enlarged cross sectional view taken on line V—V of FIG. 5A.
Figure 6:
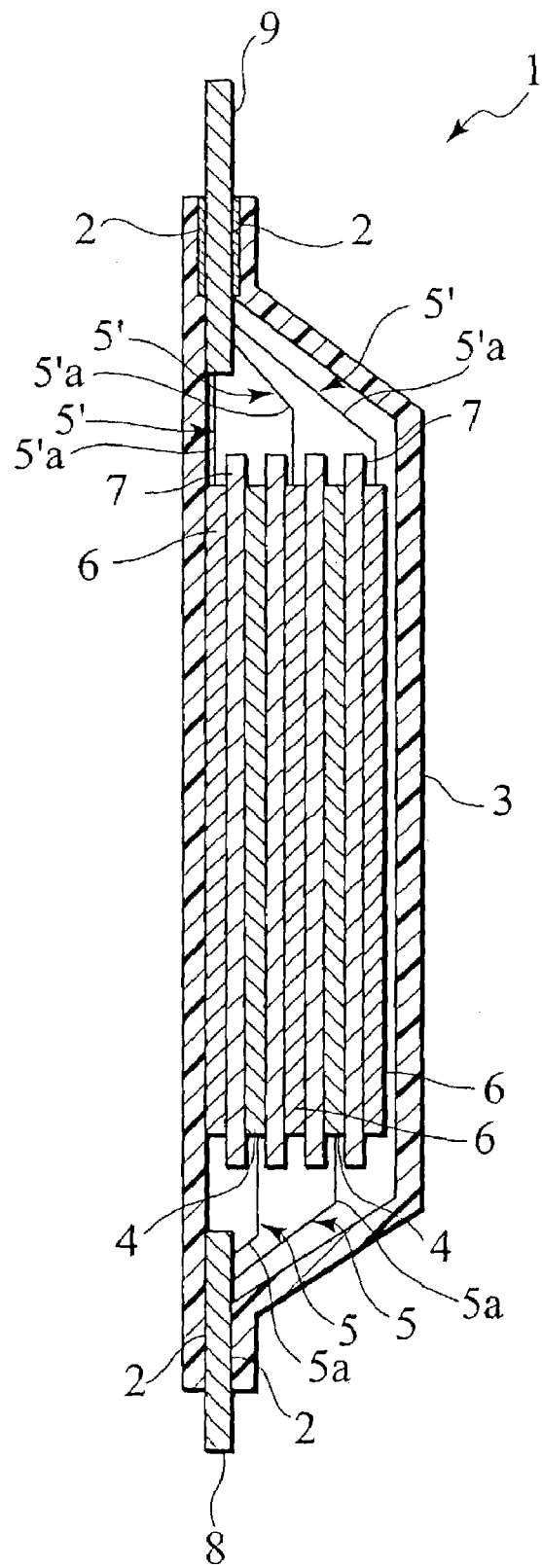
FIG. 6 is a cross sectional view taken on line II—II of FIG. 2.

As shown in FIGS. 4A to 6, an exemplary structure includes positive electrode plates 4 that are preferably made of Al-core plates (the reacting portions of the positive electrode plate current collectors 5) whose both sides are coated with the above-described positive-electrode active material and subsequently dried, negative electrode plates 6 that are preferably made of Cu-core plates (the reacting portions of the negative electrode plate current collectors 5') whose both sides are coated with the above-described negative-electrode active material and subsequently dried, and separators 7 that are preferably made of polymer electrolyte sheet. Also, since the flat type battery 1 shown in FIG. 2 has the same cross sectional structure as those shown in FIGS. 4A to 5B illustrating the flat type battery 1 shown in FIG. 1, a detailed description of the same is herein omitted. A cross sectional structure of the flat type battery 1 shown in FIG. 3 is illustrated in FIG. 6 and, since the positive-electrode terminal lead 8 and the negative-electrode terminal lead 9 have the same cross sectional areas as those, shown in FIGS. 4B and 5B of the flat type battery 1 shown in FIG. 1, a detailed description of the same is herein omitted. Incidentally in FIGS. 5A and 6, the thermally welded portions 2 at the negative-electrode terminal lead 9 are shown in an emphasized manner, respectively.

To describe more particularly, the positive electrode plate 4 includes the Al-core plate whose both sides are coated with positive-electrode active material, which contains the principal material composed of the positive electrode material and the polymer that absorbs and retain organic electrolytic solution and subsequently dried to permit the positive-electrode active material to be supported on the Al-core plate. Also, the negative electrode plate 6 includes the Cu-core plate whose both sides are coated with the negative-electrode active material, which contains principal material composed of the negative-electrode active material and the polymer that absorbs and retain organic electrolytic solution, and subsequently dried to permit the negative-electrode active material to be supported on the Cu-core plate. The separator 7 is formed of a porous sheet made of the polymer that absorbs and retains organic electrolytic solution.

And typically, the above components are held in a stacked condition and integrated into one piece by thermal welding to form a stacked electrode body (forming the electric power generating component) in such a manner that the negative-electrode active material formed at the upper side of the negative electrode 6 is placed in opposition to the positive-electrode active material of the upper positive electrode plate 4 via the separator 7 whereas lower negative-electrode active material of the negative electrode plate 6 is placed in opposition to the positive-electrode active material of the lower positive electrode plate 4 via the separator 7. Also, each of the above-described Al-core plate and the Cu-core plate is formed of a lath plate, i.e., a plate composed of a thin plate which is formed with rifts and subsequently expanded to form reticulated spaces.

Incidentally, in accordance with a number of or stacked order of layers, one side of the positive electrode plates 4 or one side of the negative electrode plates 6 may be coated with the positive-electrode active material or the negative-electrode active material.

The positive electrode plates 4 are provided with positive-electrode lead connecting portions (parts 5a of the positive-electrode current collectors 5) and, likewise, the negative electrode plates 6 are provided with negative-electrode lead connecting portions (parts 5'a of the negative electrode current collectors 5'), with the lead connecting portions being welded to the positive-electrode terminal lead 8 made of the Al-metal mother material and the negative-electrode terminal lead 9 made of Cu-metal mother material, respectively, by ultrasonic welding. This welding may be carried out by resistance welding. Also, although the positive-electrode lead connecting portion 5a of the positive-electrode current collector 5 and the negative-electrode lead connecting portions 5'a of the negative-electrode current collector 5' have been made of the same Al-metal as metallic mother material of the positive electrode plate 4 and the same Cu-metal as metallic mother material of the negative-electrode current collector 6, respectively, these current collectors may be made of another materials, respectively.

Further, the present invention is not intended to be limited to the particular composite laminate film (suitably and simply referred to as a polymer-metal composite laminate film or a polymer-metal laminate film) made of the polymer-metal forming sheath material of the battery of the present invention and may be used in a form wherein a metal film is disposed between polymer films to permit entire parts to be stacked in an integrated structure. A concrete example may include a structure wherein plural layers are placed like outer sheath protective layers (laminated outermost layers) made of polymer films, a metallic film layer and a thermally welding layer (an innermost laminate film) made of the polymer film with the whole of the films being stacked in the integrated form.

Figure 8:
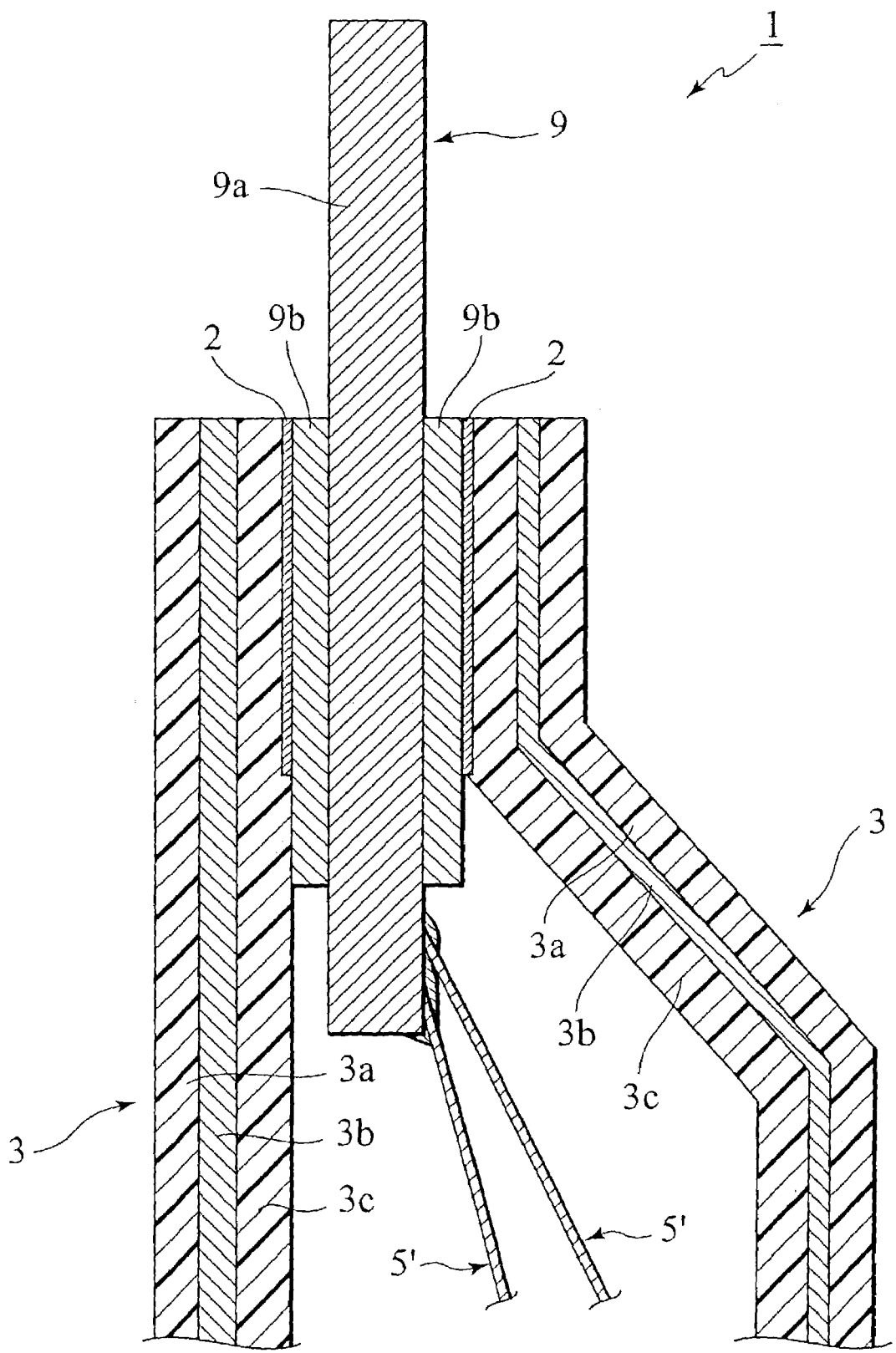
FIG. 8 is an enlarged partial cross sectional view illustrating how the surface covering layer of the electrode terminal lead is formed on an area where the terminal is held in contact with a thermally welded portion, in the embodiment according to the present invention.

More particularly, as shown in FIG. 8, the polymer-metal composite laminate film for use as the outer sheath 3 is comprised of three stacked layers including a metal film 3b, a heat resistant insulating resin film 3a disposed outside the metal film 3b, and a thermally welding and insulating resin film 3c disposed inside the metal film 3b. Such a laminate film is thermally welded by a suitable method such that a part of the thermally welding and insulating resin film 3c is welded and joined to form a thermally welded portion 2.

The above-described metal film may include an aluminum film. Further, the above-described heat resistant insulating resin film may include polyethylene tetraphthalate film or nylon film, and the thermally welding and insulating resin film may include polyethylene film or polypropylene film. However, outer sheath material of the presently filed embodiment is not limited to these materials.

With such a laminate film, by using the thermally welding insulating film to be welded by ultrasonic welding, a pair of or one sheet (configured in a bladder shape) of laminate films can be easily and reliably joined by thermal deposition. Also, in order to maximize the long-term reliability of the battery, the metallic films, forming the structural elements of the laminate sheet, may be directly joined to one another. Removing or destructing the thermal welding type resin lying between the metallic films enables the ultrasonic welding to be employed to join the metallic films to one another.

Returning now to FIGS. 1 to 6, with the flat type battery 1 of the stack configuration shown in FIG. 1 and FIGS. 4A and 5A which are cross sectional views of FIG. 1, using a pair of polymer-metal composite laminate films, as the battery outer sheaths 3 and joining the entire circumferential portions thereof by thermal welding provide a structure to allow the electric power generating component, comprised of the stack of the positive electrode plates 4, the separators 7 and the negative electrode plates 6, to be accommodated and hermetically sealed in the outer sheaths 3. Further, such a structure is similarly provided in the flat type battery 1 of the stack configuration shown in FIG. 2 and FIG. 6 which is the cross sectional view of FIG. 2. Furthermore, with the flat type battery 1 of the stack configuration shown in FIG. 3, using one sheet of the polymer-metal composite laminate as the battery outer sheath 3 and joining the opening portions of the peripheral area of the film by thermal welding provide a structure to allow the electric power generating component, comprised of the stack of the positive electrode plates 4, the separators 7 and the negative electrode plates 6, to be accommodated and hermetically sealed in the outer sheaths 3.

And, the positive electrode terminal lead 8 and the negative electrode terminal lead 9, conducted with the positive electrode plates 4 and the negative electrode plates 6, respectively, are connected to the positive-electrode current collectors 5 and the negative-electrode current collectors 5', respectively, and kept between the thermally welding portions 2 whereupon these leads are exposed to the outside of the battery outer sheaths 3. Additionally, at least either one electrode terminal lead of the positive electrode and the negative electrode has a surface covering layer made of metal which is different from the terminal mother material.

Here, although the metal (involving an alloy) for use as a principal material of the terminal mother material of the above-described electrode terminal lead may include metals such as Cu and Fe, it is possible to similarly use metals, such as Al, SUS (stainless steel) or alloy material of these compounds. In view of minimizing an increase in resistance of the whole of the electrode terminal lead, though not intended to be limited, it is preferable to employ Cu as the terminal mother material.

Further, although Ni or an alloy containing Ni can be most preferably used as the surface covering layer, metallic materials such as Ag, Au and an alloy containing Ag and Au may be similarly used. In view of reduction in cost, though not intended to be limited, it is preferable to use Ni or an alloy containing Ni.

Furthermore, although a method of covering the surface may be preferably carried out by plating metal, it is also possible to use a metallic laminated body such as a clad material.

That is, as set forth above, in order for the advantage and merit of the presently filed embodiment to be provided, the above-described surface covering layer may be provided at either one of or both of the positive electrode terminal lead and the negative electrode terminal lead, if desired.

More particularly, the metal such as Al, among the metallic materials used in the terminal mother material of the electrode terminal lead, has a proper adhesive property with respect to the polymer material of the outer sheath, as used in the metallic film material of the composite laminate film of polymer-metal of the outer sheath, and, so, it is concluded that the need for providing the surface covering layer is low. On the other hand, metals such as Cu and Fe among the metallic materials used in the terminal mother material have a relatively low adhesive property with respect to the polymer material of the outer sheath and, hence, it is concluded that the need for providing the surface covering layer is high. Here, in consideration of a general practice for the above-described metal such as Al to be used in the terminal mother material of the positive terminal lead and a general practice for above-described metals such as Cu and Fe to be used as terminal mother material of the negative terminal lead, the need for providing the surface covering layer in the positive terminal lead is low and the need for providing the surface covering layer in the negative terminal lead is high.

More in detail, with the flat type battery 1 of the stack configuration of the presently filed embodiment, as shown in FIGS. 4A and 4B, although the positive electrode terminal lead 8 has no surface covering layer made of metal different from terminal mother material, as shown in FIGS. 5A and 5B, it is preferable for the negative electrode terminal lead 9 to have the surface covering layers 9b made of metal different from the terminal mother material 9a. Such a situation may be also similarly applied to the flat type battery 1 of the stack type shown in FIG. 2 or 3.

Now, studies are conducted for the thickness (a sum of the thickness of the terminal mother material and the thickness of the surface covering layer) of the electrode terminal lead of the flat type battery 1 and for the relationship (a ratio of the thickness of the surface covering layer and the thickness of the terminal mother material) between the thickness A (shown in FIG. 5B) of the surface covering layer of the electrode terminal lead and the thickness of the terminal mother material of the flat type battery 1.

Experimental data for such studies was obtained using the flat type battery 1 prepared in the same way as Example 1, which is described later, except for that the negative electrode terminal leads obtained by altering the thickness of the electrode terminal lead or the ratio between the thickness of the surface covering layer and the thickness of the mother material. The flat type batteries 1, each of which has substantially same thickness of the negative electrode terminal lead, were prepared as 50 pieces for every predetermined thickness of the electrode terminal leads to be measured.

Figure 7B:
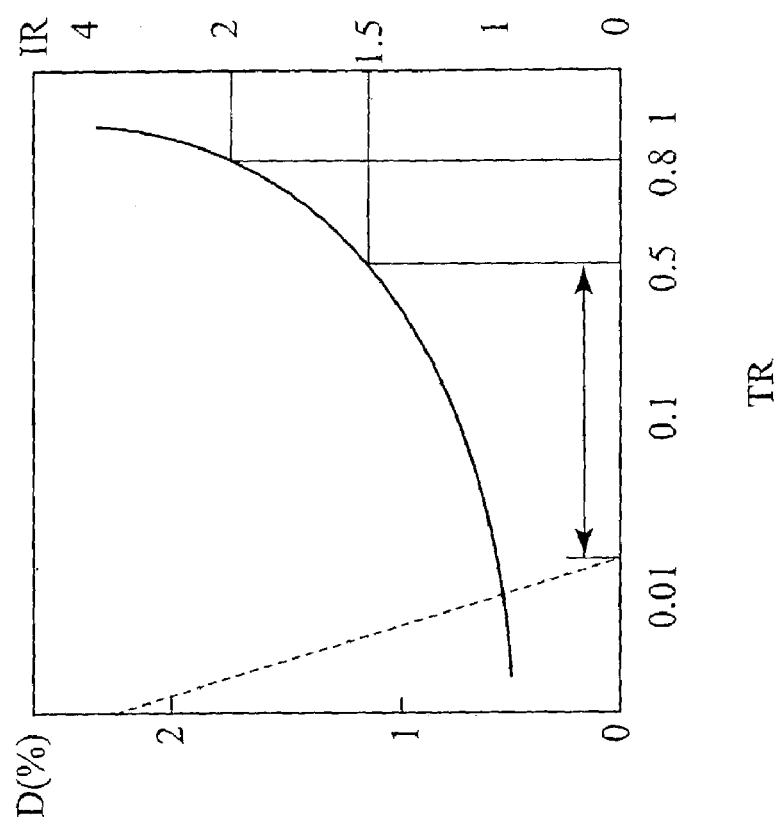
FIG. 7B is a graph illustrating the relationship between a ratio TR (a ration between the thickness of the surface covering layer and the thickness of the mother material, that is, surface-covering-layer thickness/terminal-mother-material thickness) and a resistance incremental rate IR, and the relationship between the ratio TR between the thickness of the surface covering layer of the electrode terminal lead and the thickness of the mother material and the rate D of sealing deficiency, with the rate D of sealing deficiency being plotted in the dotted line while the temperature rise T is plotted in the solid line, in the embodiment according to the present invention.
Figure 7A:
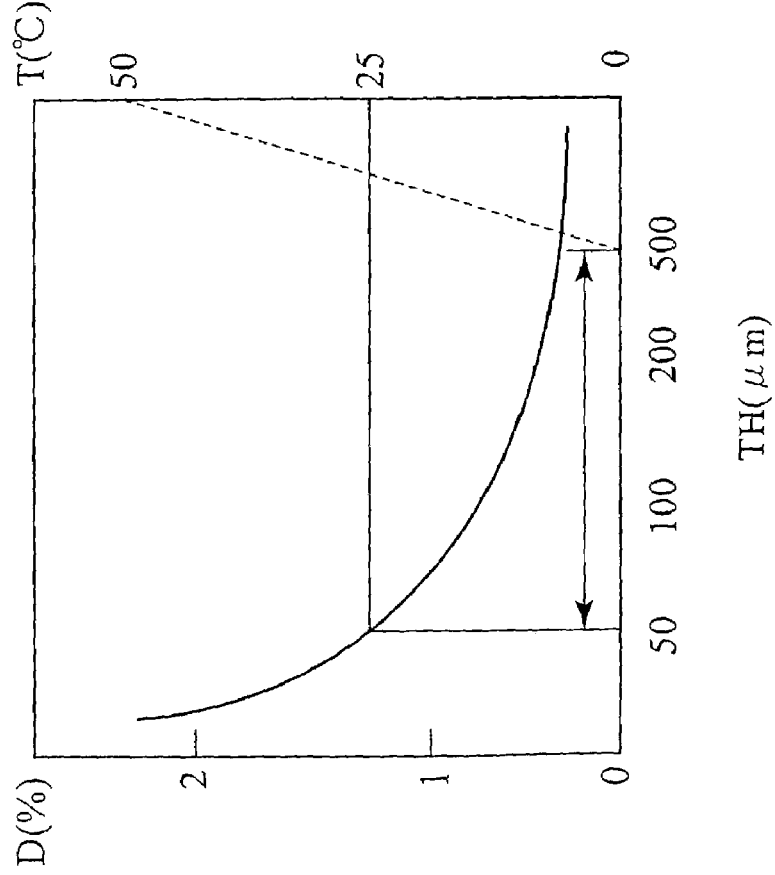
FIG. 7A is a graph illustrating the relationship between a thickness (a sum of a thickness of a terminal mother material and a thickness of a surface covering layer) TH of an electrode terminal lead and a rate D of sealing deficiency and the relationship between the thickness TH of the electrode terminal lead and temperature rise T of the electrode terminal lead, with the rate D of sealing deficiency being plotted in a dotted line while the temperature rise T is plotted in a solid line, in the embodiment according to the present invention.

As shown in FIG. 7A, if the thickness TH of the electrode terminal lead is less than 50 $\mu$m, the temperature rise T of the electrode terminal lead exceeds a value of 25° C. to be unfavorable. That is to say, in an event that the battery is mounted on an electric vehicle or a hybrid car, since there is no probability for the polymer film located at the innermost layer of the above-described polymer-metal composite laminate film to be softened unless the heat developed at the electrode terminal lead is equal to or less than 25° C., a favorable sealing property can be retained for a prolonged time period. On the contrary, if the thickness TH of the electrode terminal lead exceeds a value of 500 $\mu$m, a poor sealing property of the unit cell begins to occur, resulting in a rising increase in a defective ratio D in an unfavorable state.

As a consequence, determining the thickness of the electrode terminal lead to fall in a value equal to or greater than 50 $\mu$m and equal to or less than 500 $\mu$m enables the electrode terminal lead portion to enhance an anti-corrosion property and a sealing property with respect to an electrolyte decomposing product while limiting the temperature rise of the electrode terminal lead, with a resultant capability of enhancing a long-term durability of the sealing property for a relatively long time period even when the battery is installed in the electric vehicle or the hybrid car.

Also, here, concerning each thickness of the electrode terminal lead, 50 pieces of the flat type batteries 1 having the negative electrode terminal leads with substantially the same thickness to each other were prepared. The thicknesses of the electrode terminal leads of such 50 pieces were averaged and such averaged values were plotted. More in detail, as to each of the electrode terminal leads of such 50 pieces of the flat type batteries 1, the thickness of the electrode terminal lead was measured each at three arbitrary points of the electrode terminal lead, using a micrometer, and the thicknesses at the three points were once averaged to obtain the measured value of each of such 50 pieces. Also, the temperature rise of the electrode terminal lead of the flat type battery 1 was measured by mounting a thermocouple (K-thermocouple) onto a center of each electrode terminal lead such that, when electric discharge is implemented for five seconds at 20 C (40 A), a variation in temperature developed during the electric discharge was measured with the maximum temperature (the maximum temperature of such 50 pieces of the batteries) among the raised temperatures, and such maximum temperature was plotted. Further, measurement of the sealing defecting rate of the flat type battery 1 was conducted by placing such 50 pieces of the batteries in a constant temperature bath remaining at the temperature of 40° C. (with no control for humidity) for 60 days to confirm the presence or absence of leakage of liquid by visual inspection or by using a litmus paper. The defective rate was calculated based on a ratio of the number of piece of the flat type batteries 1 resulting in the leakage of liquid to the total number of measured batteries and plotted.

As shown in FIG. 7B, from the viewpoint of minimizing an increase in resistance of the electrode terminal lead (with the rate IR of resistance increase being selected to be equal to or less than 1.5) while decreasing the sealing defective rate D, the ratio TR between the thickness of the surface covering layer and the thickness of the mother material (the thickness of the surface covering layer/thickness of the terminal mother material) is most preferably selected in a range equal to or above 0.01 and equal to or less than 0.5, but may be allowable in actual practice if such a ratio TR remains in the range equal to or above 0.01 and equal to or less than 0.8. That is to say, if the ratio between the thickness of the surface covering layer and the thickness of the mother material drops below 0.01, the anti-corrosion property relative to the electrolyte decomposing product is lowered, thereby causing an inferior sealing with a resultant rising increase in the sealing defecting rate D. Further, if the ratio between the thickness of the surface covering layer and the thickness of the mother material exceeds a value of 0.8, the resistance increase rate rapidly increases to become more than doubled and cannot be tolerated by any possibility. Also, if the ratio between the thickness of the surface covering layer and the thickness of the mother material falls in a range equal to or less than 0.5, since the resistance increase rate can be decreased in a range equal to or less than 1.5 times, it is possible to limit the temperature rise caused by heat development of the electrode terminal lead.

Here, the ratio between the thickness of the surface covering layer of the electrode terminal lead and the thickness of the mother material was obtained in a way wherein, preparing 50 pieces of the flat type batteries 1 as set forth above, the cross section of the electrode terminal lead was observed through SEM and the thickness was measured at arbitrary five points to obtain a thickness in average. Also, as shown in FIG. 5B, the thickness of the surface covering layer refers to the thickness A of an upper covering layer and the thickness A of a lower covering layer and does not refer to the total thickness of both covering layers. Also, the resistance of the electrode terminal lead was obtained by measuring the resistance at both ends of the electrode terminal lead using a mili-ohm high tester 3560 AC made by HIOKI, and the resistance increase rate was plotted as a ratio of the measured value to the resistance value of only the terminal mother material. In addition, the sealing defective rate was measured in the same method as that set forth above.

Accordingly, by selecting the ratio between the thickness of the surface covering layer and the thickness of the mother material to fall in a range equal to or greater than 0.01 and equal to or less than 0.8 and more preferably in a range equal to or greater than 0.01 and equal to or less than 0.5, it becomes possible to ensure the anti-corrosion property relative to the electrolyte decomposing product of the electrode terminal lead and the sealing property such that, even when the battery is installed in the electric vehicle or the hybrid car, the life characteristic and the sealing property can be ensured for a relatively long period of time.

That is, as shown in FIG. 8, typically, by placing the surface covering layers 9b, made of metal, onto the upper surface of the terminal mother material 9a of the electrode terminal lead 9 of the negative electrode at least over an area in contact with the thermally welded portion 2, the anti-corrosion property of the electrode terminal due to the electrolyte decomposing product is improved and the sealing property of the electrode terminal lead, kept between the thermally welded portions and exposed to the outside area of the outer sheath, is remarkably improved in terms of a long term reliability, with a resultant capability of enhancing a favorable sealing property for a prolonged period. Further, of course, the electrode terminal lead of the positive electrode may have the terminal mother material whose upper surface is similarly provided with the surface covering layer at least over the thermally welded portion of at least the battery outer sheath, thereby making it possible to enhance a favorable sealing property.

The reason for such improvement over the anti-corrosion property of the electrode terminal is that since metal for use in the surface covering layer 9b formed over the surface of the terminal mother material 9a of the electrode terminal lead 9 is not restricted to the material with electrically high conductivity lower in electrical resistance like terminal mother material 9a, it is possible to suitably select material having high adhesiveness to the polymer material 3c, forming the battery innermost layer of the outer sheath 3, and an anti-corrosion property against the electrolytic solution inside the battery 1 and the decomposing product thereof. For this reason, even when the temperature of the electrode terminal lead 9 and the internal pressure of the battery increase, it is possible to prevent separation and gap from occurring between the polymer material 3c, forming the battery innermost layer of the outer sheath 3, and the surface covering layer 9b at the thermally welded portion 2. As a consequence, it is possible to remarkably improve the sealing property at the area of the electrode terminal lead 9 in contact with the thermally welded portion 2 of the outer sheath 3. Also, within an extent in which the temperature of the electrode terminal lead 9 and the battery inside pressure increase, since no adverse affect occurs in a metal-to-metal junction between the terminal mother material 9a and the metal surface covering layer 9b, there is no probability where the electrolyte and the decomposing product thereof penetrate through the junction between the terminal mother material 9a and the metal surface covering layer 9b and, further, since these metal components per se have anti-corrosion property, the sealing property at the junction between the terminal mother material 9a and the metal surface covering layer 9b can be remarkably improved.

Further, as shown in FIG. 8, by forming the surface covering layer 9b over the terminal 9 at least the area to be brought into contact with the thermally welded portion 2 so as to adjust the surface area in which the surface covering layer 9b is formed, the increase in resistance of the whole of the electrode terminal lead 9 can be limited and, hence, the heat developed in the electrode terminal lead 9 during discharging at a large electric current when installed in the electric vehicle and the hybrid car can be restricted with a resultant improvement in the life characteristic while enabling the sealing property to be enhanced for a relatively longer time period. Here, the surface area of the surface covering layer 9b varies in proportionate with a longitudinal length of the surface covering layer 9b shown in FIG. 8.

Figure 9:
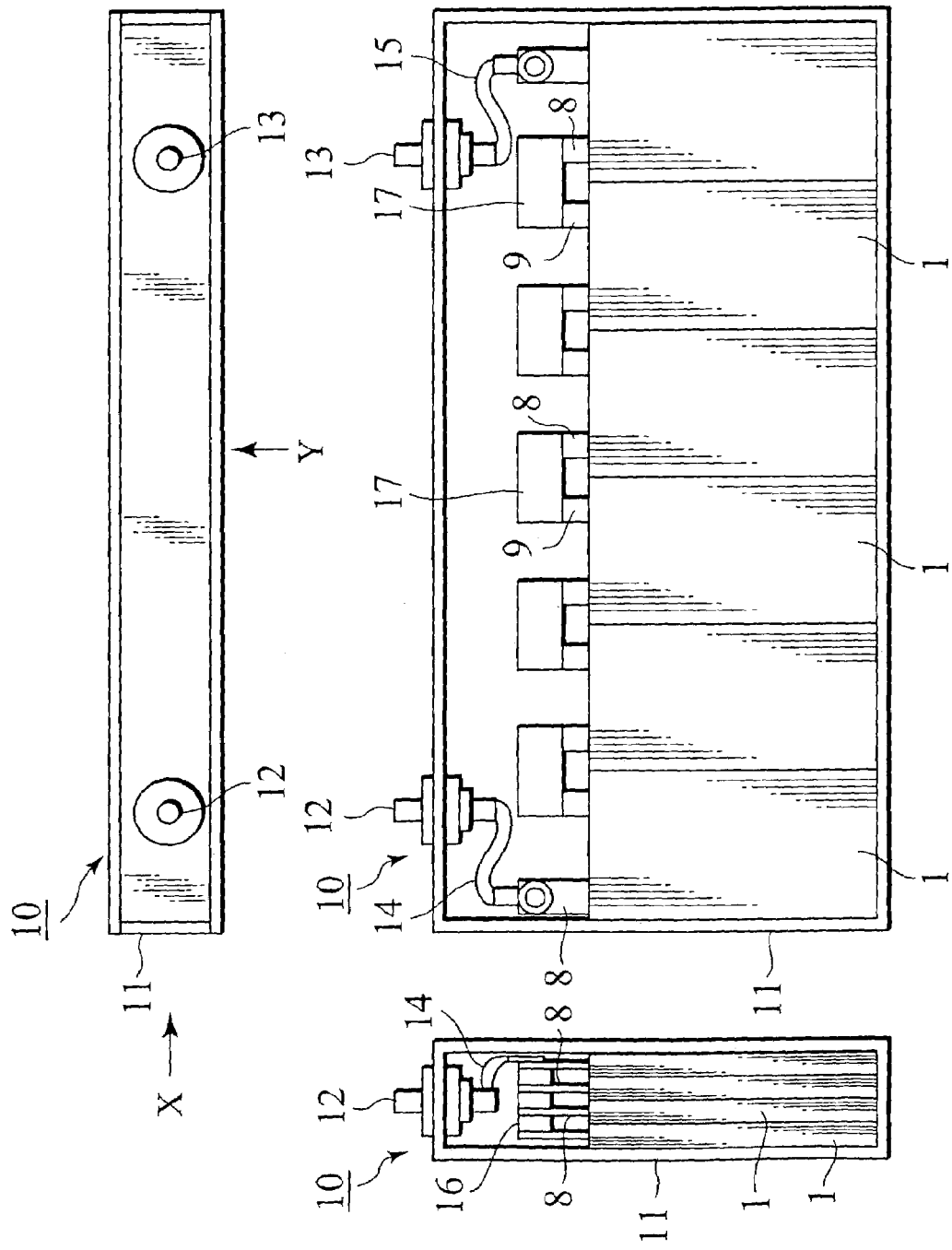
FIG. 9A is a plan view illustrating a structure of a battery of the embodiment according to the present invention.
FIG. 9B is a side view permeably illustrating an interior as viewed in a direction X of FIG. 9A and as shown while conveniently rotating in a counterclockwise direction with 90°.
FIG. 9C is a front view permeably illustrating the interior as viewed in a direction Y in FIG. 9A.

In particular, the surface covering layer 9b may suffice to be formed over at least the area wherein the electrode terminal lead 9 remains in contact with the thermally welded portion 2, with no limitation being specifically intended for the other remaining area of the electrode terminal lead 9a which may be suitably determined in compliance with the purpose of use. In a case where there is a need for protecting the terminal mother material 9 at an area located internally of the flat type battery 1 from corrosion due to the electrolyte and the decomposing product thereof, it is said that such an area of terminal mother material may be formed with the surface covering layer 9b. On the other hand, in a case where, when connecting the current collectors 5' to the electrode terminal lead 9 by welding or soldering, a difficulty is encountered in carrying out welding or soldering at a junction between the metal used in the surface covering layer 9b and the metal forming the current collectors 5' and a poor joining property is obtained, such a junction may not be formed with the surface covering layer 9b. Further, in connection with an area exposed outside the flat type battery 1, there are some instances where the electrode terminal leads 8 (9) are not connected by welding and merely connected to one another by connector members 16, 17 when forming a battery 10, as shown in FIGS. 9A and 9B, and if electrical resistance of the metal used in the surface covering layer is greater than that of the metal forming the terminal mother material, it may be preferable not to form the surface covering layer 9b over such connecting portions. Also, in view of a manufacturing process, if it is simple to cover an entire surface of the electrode terminal lead and the surface covering layer can be simply removed in a subsequent manufacturing stage depending on a demand, then, such a process may be adopted.

If Cu, Fe or an alloy of these compounds is employed as the above-described terminal mother material 9a, an increase in resistance of whole of the terminal lead 9 can be minimized owing to its excellent electric property (such as low electric resistance). Further, forming the surface covering layer 9b with Ni enables the surface covering layer to be formed at a low cost and an improved adhesive property with respect to the polymer material 3c forming the battery innermost layer of the outer sheath 3 can be obtained, enabling an excellent sealing property to be retained between the outer sheaths (the polymer materials) even when the battery temperature rises.

By the way, according to the presently filed embodiment, at least more than two pieces of the above-described flat type batteries can be used in series, parallel or in combination of these connections to form the battery.

More particularly, as shown in FIGS. 9A to 9C, connecting four sheets of the above-described flat type batteries 1 in parallel (see FIG. 9B) and further connecting six sheets of the flat type batteries 1, composed of the four sheets in parallel, in series to be accommodated in a battery case 11 (see FIGS. 9A and 9C) enables the battery 10 to be formed.

Here, a positive terminal 12 and a negative terminal 13, mounted to a lid body formed at an upper portion of the battery case 11, are electrically connected to the electrode lead terminals 8, 9 of the respective flat type batteries 1 via positive and negative terminal lead wires 14, 15 of the battery 10. Further, when connecting four sheets of the flat type batteries 1 in parallel, the electrode terminal leads 8 of the respective flat type batteries 1 may be electrically connected to one another using suitable connector members such as spacers 16 (see FIG. 9B). Similarly, when connecting six sheets of the flat type batteries 1, of which four sheets are connected in parallel, in series, the electrode terminal leads 8, 9 of the respective flat type batteries 1 may be electrically and sequentially connected to one another using suitable connector members such as bus bars 17 (see FIG. 9C). However, the battery of the presently filed embodiment is not limited to such a particular structure and may take another structure composed of the flat type batteries 1 appropriately connected in parallel or in series. Also, such a battery may be provided with various measurement equipments and control equipments in compliance with application purposes. In order to monitor a battery voltage, a voltage measurement connector may be provided on the lid body formed on the upper portion of the battery case 11.

Further, by connecting at least more than two batteries set forth above in series, in parallel or in combination of these connections to form a compound battery, it is possible to produce the compound battery at a relatively low cost without preparing new batteries to meet requirements of battery capacities or power outputs for application purposes.

Figure 10:
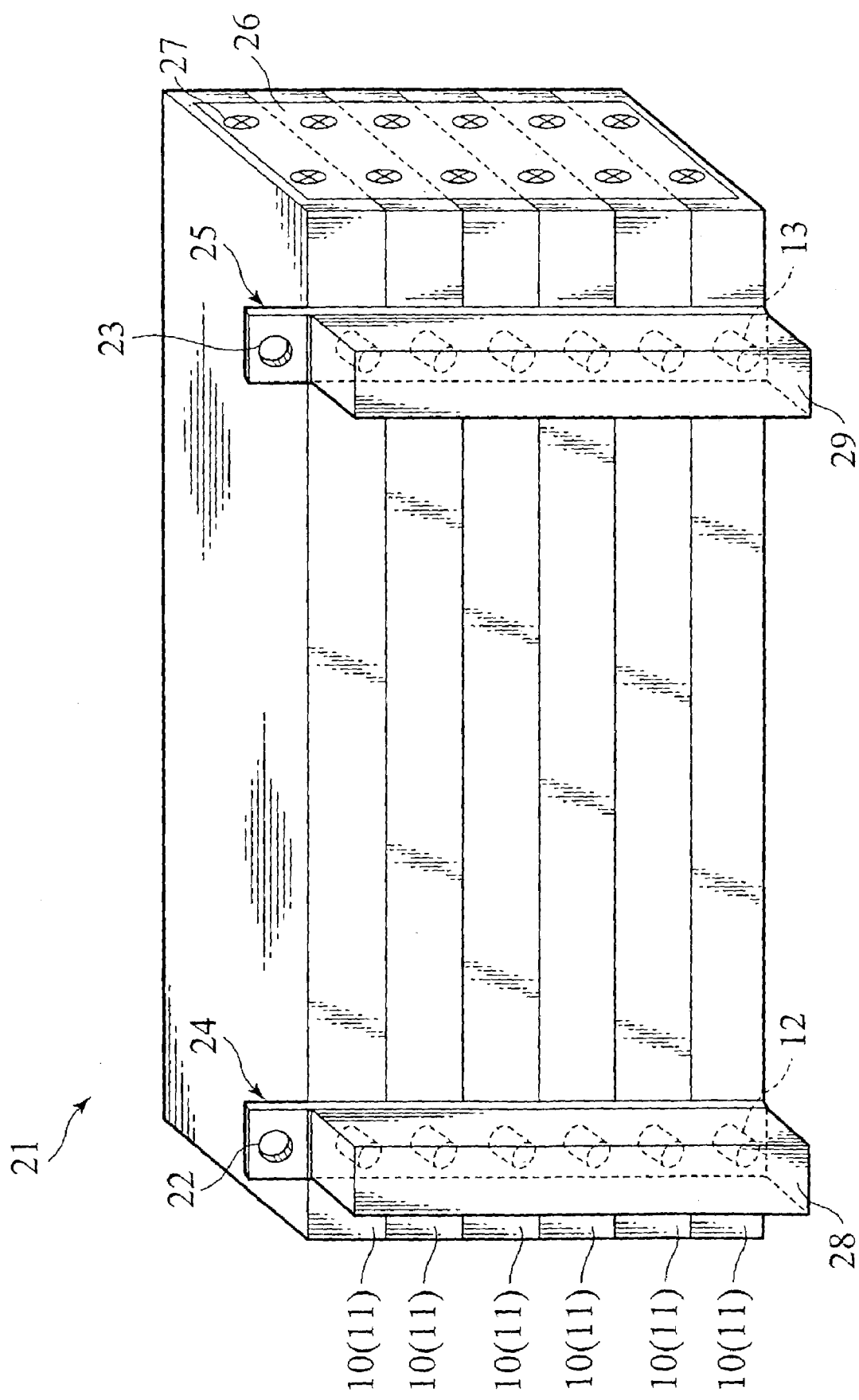
FIG. 10 is a schematic perspective view illustrating a structure of a compound battery of the embodiment according to the present invention.

In order for six sets of the above-described batteries 10 connected in parallel to form a compound battery 21, as shown in FIG. 10, the compound battery is formed by electrically connecting the positive electrode terminal 12 and the negative electrode terminal 13, which are located at the lid bodies of the upper portions of the respective battery cases 11, to a battery-positive-electrode-terminal connecting plate 24 and a battery-negative-electrode-terminal connecting plate 25 having an outer positive electrode terminal portion 22 and an outer negative electrode terminal portion 23, respectively. And, connecting plates 26, having openings corresponding to threaded apertures (not shown) formed at both sides of the respective battery cases 11, are secured to the battery cases by means of fixture screws 27, thereby connecting the respective batteries 10 to one another. Also, the positive electrode terminals 12 and the negative electrode terminals 13 are protected by positive electrode and negative electrode insulation covers 28, 29, which are identified in suitable colors in color cording such as red and blue.

Furthermore, mounting the above-described batteries and/ or the above-described compound battery on the electric vehicle and the hybrid car enables the electrode terminal leads to be prevented from developing heat during discharge of a large electric current when installed, with a resultant capability of improving the life characteristic while addressing the issues set forth above to enhance a favorable sealing property for a relatively prolonged time period.

Figure 11:
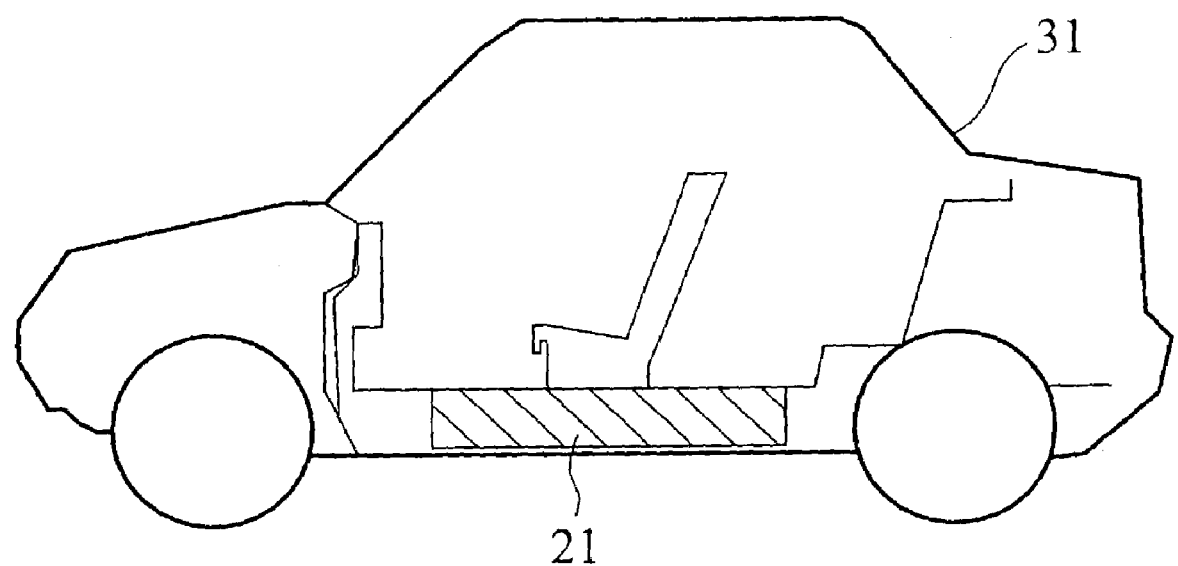
FIG. 11 is a schematic view typically representing a vehicle installed with the compound battery of the embodiment of the present invention.

As shown in FIG. 11, installing the compound battery 21 underneath a seat at a central portion of a vehicle body of the electric vehicle or the hybrid car 31 provides a convenience because of taking a wide vehicle compartment and trunk room. However, the present invention is not limited to such a structure and the battery of the present invention may be located underneath the rear trunk room or, in an alternative case where an engine is dispensed with like the electric vehicle, the battery may be installed in a front area of the vehicle body that would accommodate the engine. Also, the vehicle body may not be installed with the compound battery 21 but with the batteries depending on the application purposes, and a combination of these batteries and the compound battery may be installed. Moreover, the vehicles in which the batteries and/or the compound battery of the presently filed embodiment can be installed includes the electric vehicle and the hybrid car set forth above, but the present invention is not limited to such applications.

Now, more concrete Examples and Comparative Example are described below.

EXAMPLE 1

In this Example, as shown in FIG. 1, the flat type battery 1 was prepared which had a structure wherein the entire circumferences of the outer sheaths each composed of the polymer-metal composite laminate films were joined by thermal welding to allow the positive terminal lead and the negative terminal lead to be taken out through one location of the thermally welded portions.

In particular, the negative terminal lead was employed which included a copper foil (the terminal mother material) with a thickness of 150 $\mu$m that was covered with the surface covering layer with a thickness of 5 $\mu$m formed by plating Ni. The electrode included the positive electrode composed of positive-electrode active material of $LiMn_2O_4$ enabled to occlude or remove lithium ion and the negative electrode composed of amorphous-carbon negative-electrode active material enabled to occlude or remove lithium ion, with the circumferential portions of the outer sheaths being joined by thermal welding to be entirely sealed to form the flat type battery with an output capacity of approximately 2 Ah.

And, as shown in FIGS. 9A to 9C, the four sheets of such flat type batteries were connected in parallel, with the six sheets of the four flat type batteries connected in parallel being further connected in series to form an assembly, which in turn was accommodated in the battery case made of metal to form the battery 10 with an output capacity of approximately 8 Ah.

Also, the separators forming the electric power generating elements were prepared by forming three layers with PP-PE-PP (polypropylene film-polyethylene film-polypropylene film) having a thickness of 30 $\mu$m, and electrolytic solution was prepared by dissolving 1 mol/l of $LiBF_4$ into propylene carbonate. Moreover, the positive electrode terminal lead was made of an aluminum foil (the terminal mother material) with a thickness of 150 $\mu$m.

EXAMPLE 2

In this Example, the flat type batteries 1 were used each using the negative-electrode terminal lead wherein a copper foil with a thickness of 150 $\mu$m was formed with the surface covering layer with a thickness of 10 $\mu$m by plating Ni with the other components parts being formed in the same manner as that of Example 1 to form the battery 10.

EXAMPLE 3

In this Example, the flat type batteries 1 were used each using the negative-electrode terminal lead wherein the copper foil with a thickness of 150 $\mu$m was formed with the surface covering layer with a thickness of 0.5 $\mu$m by plating Ni with the other components parts being formed in the same manner as that of Example 1 to form the battery 10.

EXAMPLE 4

In this Example, the flat type batteries 1 were used each using the negative-electrode terminal lead wherein an iron foil with a thickness of 150 $\mu$m was formed with the surface covering layer with a thickness of 5 $\mu$m by plating Ni with the other components parts being formed in the same manner as that of Example 1 to form the battery 10.

Comparative Example 1

In this Comparative Example, the flat type batteries 1 were used each using the negative electrode terminal lead made of the copper foil with a thickness of 150 μm per se, i.e., with no surface covering layer, with the other components parts being formed in the same manner as that of Example 1 to form the battery 10.

Characteristic Evaluation

The batteries formed in Examples 1 to 4 and Comparative Example 1 were used and these batteries were kept in the constant temperature bath at the temperature of 40° C. (with no control for humidity) for sixty days and, thereafter, the batteries were demolished to enable the sealed portions of the unit cells to be confirmed, thereby carrying out the visual inspection and confirmation of the presence or absence of the leakage of liquid using the litmus paper. The defective rate was calculated at the rate of the number of pieces of the flat type batteries, where leakage of liquid was caused, to the total number of pieces.

Results of these characteristic tests are designated in Table 1.

TABLE 1

|  | Rate of Sealing Deficiency (%) |
| --- | --- |
| Comparative Example 1 | 2.3 |
| Example 1 | 0 |
| Example 2 | 0 |
| Example 3 | 0 |
| Example 4 | 0 |

As apparent from the above Table 1, only the battery of Comparative Example 1 is recognized to have the sealing deficiencies. By the way, all of the sealing deficiencies appeared in the battery of Comparative Example 1 are recognized at areas where the negative-electrode terminal leads are held in contact with the thermally welded portions.

With the structure of the present invention set forth above, forming the battery with at least more than two flat type batteries, which are connected in series or in parallel, wherein at least either one of the positive electrode or the negative electrode of the electrode terminal leads has a surface covered with metal (alloy) different from the terminal mother material forming the principal material, enables a favorable sealing property to be enhanced while improving a life characteristic.

The entire content of a Patent Application No. TOKUGAN 2002-109187 with a filing date of Apr. 11, 2002 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A battery comprising:
    a plurality of flat type batteries each of which is provided with:
        an outer sheath having a composite laminate film made of polymer and metal;
        an electric power generating component including a positive electrode plate, a separator and a negative electrode plate and accommodated and hermetically sealed in the outer sheath by compelling at least a part of a circumference of the outer sheath to be joined by thermal welding to form thermally welded portions;
        a positive-electrode terminal lead conductive with the positive electrode plate and held between the thermally welded portions to be exposed to an outside of the outer sheath; and
        a negative-electrode terminal lead conductive with the negative electrode plate and held between the thermally welded portions to be exposed to the outside of the outer sheath, at least one of the positive-electrode terminal lead and the negative-electrode terminal lead having a surface covering layer made of a metal different from that of a terminal mother material of the at least one of the positive-electrode terminal lead and the negative-electrode terminal lead; and
    a connector member electrically connecting the plurality of flat type batteries to one another, wherein the surface covering layer is formed on areas of the positive-electrode terminal lead or the negative-electrode terminal lead in which the thermally welded portions are held in contact.

2. The battery according to claim 1, wherein the surface covering layer is formed on both sides of the negative electrode terminal lead.

3. The battery according to claim 1, wherein the plurality of flat type batteries are electrically connected in series, in parallel or in a combination of series and parallel.

4. The battery according to claim 1, wherein the terminal mother material is made of Cu, Fe or an alloy containing at least one of Cu and Fe.

5. The battery according to claim 4, wherein the surface covering layer is made of Ni or an alloy containing Ni.

6. The battery according to claim 1, wherein a value of a thickness of the surface covering layer divided by a thickness of the terminal mother material is equal to or greater than 0.01 and equal to or less than 0.5.

7. The battery according to claim 1, wherein a sum of a thickness of the surface covering layer and a thickness of the terminal mother material is equal to or greater than 50 μm and equal to or less than 500 μm.

8. The battery according to claim 1, wherein a pair of the outer sheaths are prepared and the thermally welded portions are formed around entire circumferences of the pair of the outer sheaths.

9. The battery according to claim 1, wherein the outer sheath is folded in a bladder shape to form an opening portion at which the thermally welded portions are formed.

10. The battery according to claim 1, wherein a plurality of the batteries are electrically connected in series, in parallel or in combination of series and parallel to form a compound battery.

11. The battery according to claim 1, wherein the battery is installed in a vehicle.

12. A method of manufacturing a battery, comprising:
    preparing a plurality of flat type batteries each of which is provided with:
        an outer sheath having a composite laminate film made of polymer and metal;
        an electric power generating component including a positive electrode plate, a separator and a negative electrode plate and accommodated and hermetically sealed in the outer sheath by compelling at least a part of a circumference of the outer sheath to be joined by thermal welding to form thermally welded portions;

a positive-electrode terminal lead conductive with the positive electrode plate and held between the thermally welded portions to be exposed to an outside of the outer sheath; and a negative-electrode terminal lead conductive with the negative electrode plate and held between the thermally welded portions to be exposed to the outside of the outer sheath, at least one of the positive-electrode terminal lead and the negative-electrode terminal lead having a surface covering layer made of a metal different from that of a terminal mother material of the at least one of the positive-electrode terminal lead and the negative-electrode terminal lead; and electrically connecting the plurality of flat type batteries to one another, wherein the surface covering layer is formed on areas of the positive-electrode terminal lead or the negative-electrode terminal lead in which the thermally welded portions are held in contact.

* * * * *